May 20, 1952  A. PALATNICK  2,597,667
MIRROR MEANS FOR GAS JET VIEWER FOR OVEN GAS FLAMES
Filed Aug. 14, 1950  3 Sheets-Sheet 1
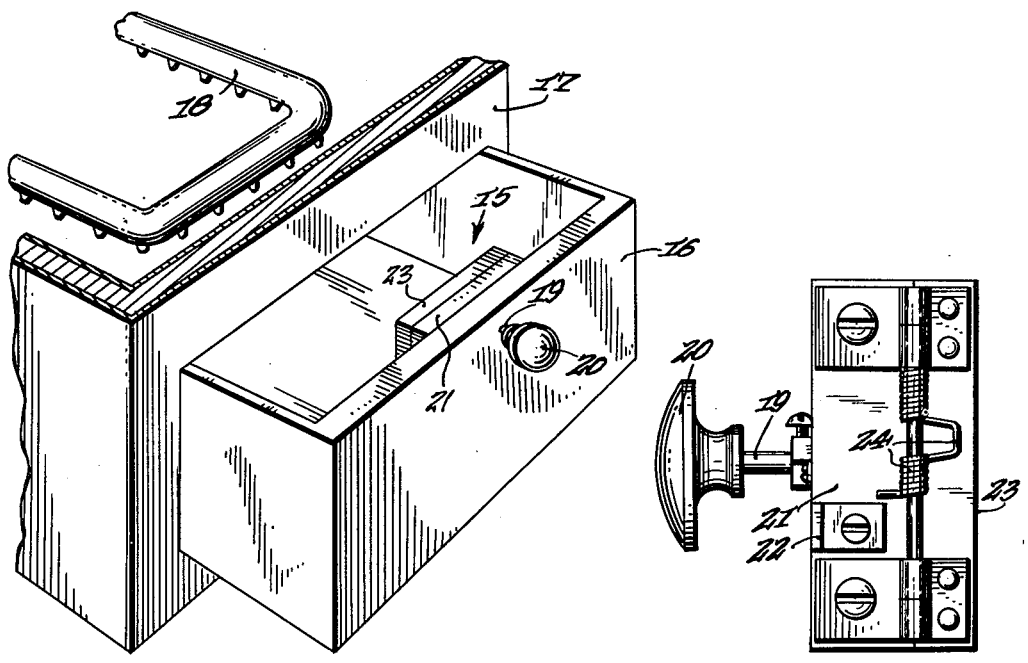
FIG. 1.
FIG. 3.
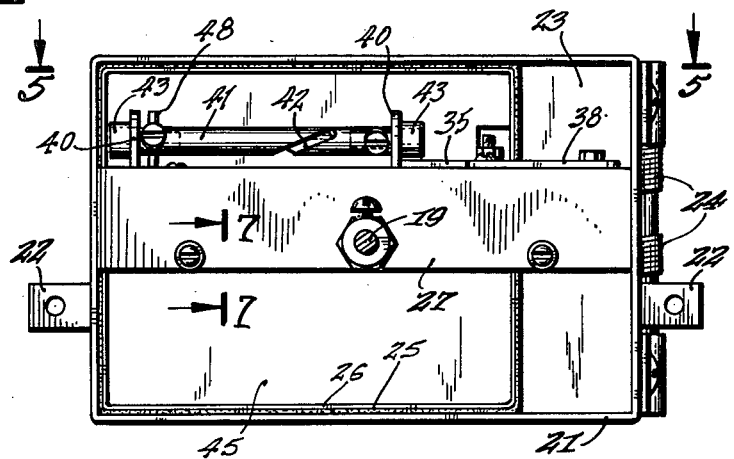
FIG. 2.
INVENTOR.
AARON PALATNICK
BY
ATTORNEY.

May 20, 1952 A. PALATNICK 2,597,667
MIRROR MEANS FOR GAS JET VIEWER FOR OVEN GAS FLAMES
Filed Aug. 11, 1950 3 Sheets-Sheet 2
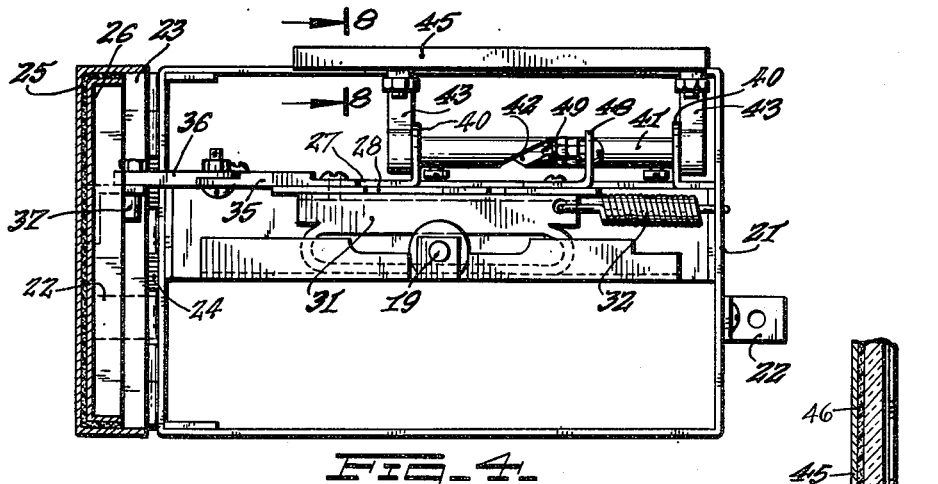
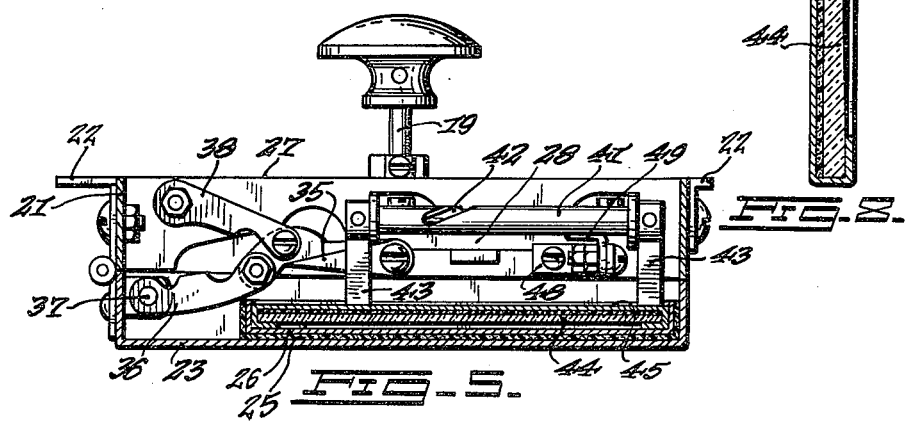
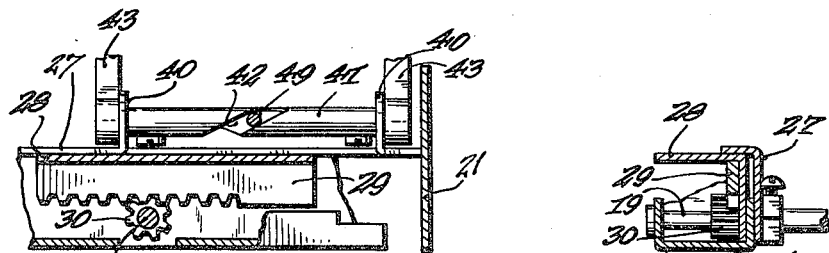
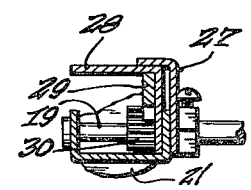
INVENTOR.
AARON PALATNICK
BY
ATTORNEY

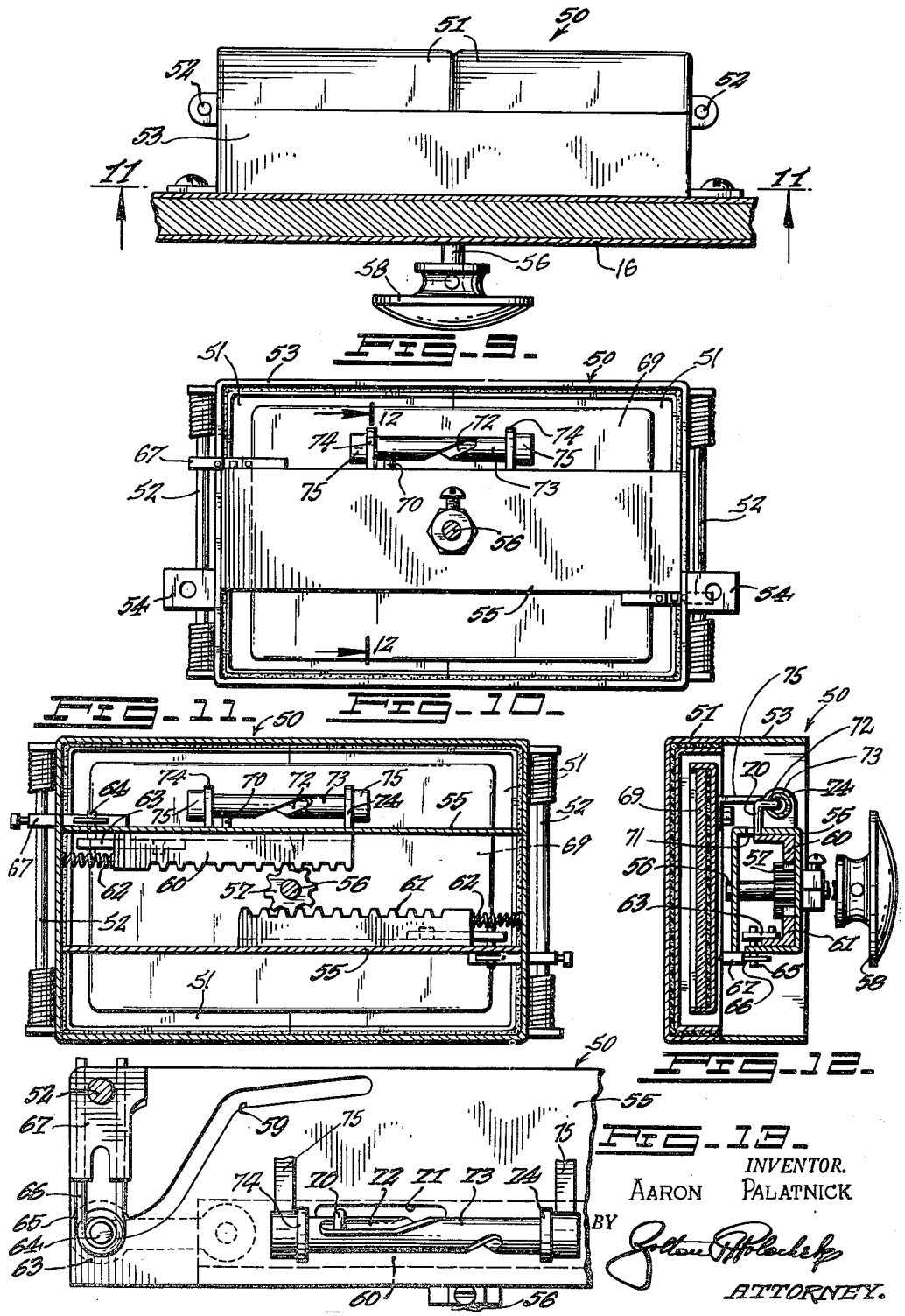

Patented May 20, 1952

2,597,667

UNITED STATES PATENT OFFICE 2,597,667

MIRROR MEANS FOR GAS JET VIEWER FOR OVEN GAS FLAMES

Aaron Palatnick, Bronx, N. Y.

Application August 14, 1950, Serial No. 179,219

9 Claims. (Cl. 88—92)

This invention relates to new and useful improvements in gas ranges and the like.

It is the custom, when lighting the broiler jets of a gas range, to kneel on the floor or otherwise stoop down to peer into the broiler to ascertain the condition of said jets as lighted or not. This, it will readily be seen, is not only an uncomfortable procedure but also is a dangerous one, flash burns of the head and face being a not uncommon occurrence.

One object of the invention is the provision of means in the form of a mirror for determining the condition of the broiler jets of a gas range from a comfortable, safe, standing position.

Another object of the invention is the provision of a unit including the mirror means, mountable on the front wall of a broiler drawer of a said gas range.

A further object of the invention is to construct the said unit so that the mirror means are enclosed therein and protected when not in use, but are readily moved to operating position.

Still another object of the invention is to construct said unit so that the same occupies a minimum of space in the broiler drawer.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary view of a broiler door showing the contemplated positioning therein of the device of the present invention.

Fig. 2 is a rear elevational view of the first embodiment of the invention.

Fig. 3 is a side elevational view of the first embodiment.

Fig. 4 is a front elevational view of the device with the door opened and the mirror raised.

Fig. 5 is a sectional view taken along the lines 5—5 in Fig. 2, but turned 180°.

Fig. 6 is a fragmentary detail view wherein is seen the arrangement for raising the mirror.

Fig. 7 is a sectional view taken along the lines 7—7 in Fig. 2.

Fig. 8 is a sectional view taken along the lines 8—8 in Fig. 4.

Fig. 9 is a plan view of a second embodiment of the invention.

Fig. 10 is a rear elevational view of the second embodiment.

Fig. 11 is a sectional view taken along the lines 11—11 in Fig. 9.

Fig. 12 is a sectional view taken along the lines 12—12 in Fig. 10.

Fig. 13 is a fragmentary enlarged detail view illustrating the door opening and mirror raising arrangement.

With reference to Fig. 1, it will be seen how the first embodiment 15 of the invention is adapted to be mounted in the drawer 16 of a broiler 17 which includes also a gas jet arrangement 18. An operating shaft 19 is arranged to pass through the front side of the drawer 16 and carries a turning knob 20 on its outer extremity.

As seen in Figs. 2, 3 and 4 also, the first embodiment comprises a four-sided frame 21 having ears 22 attached thereto and whereby it may be secured in the mentioned broiler drawer 16. Suitably hinged and adapted when closed to cover the front side of the frame 21 is a door 23 which is normally urged closed by a spring 24.

The construction of the door, as best seen in Fig. 4, is such as to include a heat insulative material 25 between itself and an inner metallic lining 26. The purpose for this will be seen hereinafter.

As seen in Figs. 5, 6 and 7 also, the construction of the first embodiment includes an angle piece 27 mounted in and between the sides of the frame 21. A second angle piece 28 is arranged to be slidable relative to the first and has secured thereto a rack 29. Said rack is adapted to cooperate with a pinion 30 on the aforementioned operating shaft 19. A forwardly disposed member 31, also secured to the second angle piece 28, is interconnected with the frame 21 by a coil spring 32, which spring causes the second angle piece 28 and the rack 29 to be returned after said rack has been moved by the turning of the knob 20, and the resultant turning of the pinion 30.

As best seen in Fig. 5, a first link 35 is pivotally connected both to the second angle piece 28 and a second link 36, which second link is pivotally connected, as at 37, to the door 23. A third link 38 is provided to be pivotally connected to both the first angle piece 27 and the first link 35. The just described arrangement is such that the operation of the rack 29 and the resultant movement to the left in Fig. 5 of the integral second angle piece 28 will effect the opening of the door 23.

Fixedly mounted on the first angle piece 27 is a pair of brackets 40 between which is journalled a sleeve 41 having a helical cam slot 42 formed therein. Outwardly of the brackets 40 the sleeve 41 is provided with a pair of lever arms 43 which are both fixed at their extremities to a mirror 44. As best seen in Fig. 8 the mirror 44 is slightly concaved and its construction includes a metal frame 45 and a layer 46 of heat insulative material between the metal frame and the mirror itself.

Now, as seen in Figs. 4, 5 and 6, a bracket 48 securely carried on the second angle piece 28 is provided with a stud 49 adapted to ride in the cam slot 42 in the sleeve 41.

With the just described arrangement the mirror 44 is raised just after the door 23 is opened and this raising of the mirror is effected by the cooperation of the stud 49, which moves with the second angle piece 28, with the cam slot 42 in the sleeve 41, which causes the sleeve to rotate and to raise the lever arms 43 to which the mirror frame is attached.

It will be seen that when the device is not in use the mirror will be seated in the lining 26 of the door 23. The aforementioned insulative material provided in both the door and mirror construction protects the mirror from the heat of the broiler when the same is in use.

A second embodiment of the invention designated 50 and seen in Figs. 10 through 13, contemplates the provision of a pair of doors 51 which are carried fixedly on hinge pins 52 which themselves are pivotally supported vertically on the front side edges of a frame 53 which has ears 54 for securing it in a broiler door.

Secured in and between the sides of the frame 53 is a mechanism housing 55. Journalled between the front and rear walls of the housing 55 is an operating shaft 56 carrying a pinion 57 and having a knob 58 secured on the rear extremity thereof.

Arranged to cooperate with the pinion 57 inside the housing 55 are upper and lower racks 60 and 61, respectively, each of which is provided with a spring 62 whereby it is returned to a normal position after it has been moved by operation of the mentioned pinion.

As best seen in Fig. 13 a link 63 is pivotally connected to the upper rack 60 and carries an upright stud 64 which is disposed both in an arcuate slot 59 in the upper side of the housing 55 and in a loop 65 formed in a wire extensible member 66. Said extensible member fits slidingly in a bell crank 67 adjustably secured to the hinge pin 52.

With this arrangement, movement of the upper rack 60 to the right in Figs. 11 and 13 will cause the stud 64 to follow the arcuate slot 59 and thereby rotate the bell crank 67 and the hinge pin 52 to open its respective door 51. It will be seen that the extensible member 66 will extend as the stud approaches the end of the slot 59 and will slide back into the bell crank 67 as the spring 62 returns the rack and several other elements to normal closed-door positions.

The just described arrangement is duplicated for opening the other door and differs only in that the arcuate slot thereof is located in the lower side of the housing 55.

Provided in this embodiment for raising a mirror 69 is a stud 70 carried on the upper rack 60 and passing through a longitudinal slot 71 in the upper side of the housing 55 and cooperating with a helical cam slot 72 formed in a sleeve 73 journalled between brackets 74 fixed on the housing 55. Lever arms 75 secured to the extremities of the sleeve 73 are attached to the frame of the mirror 69, and it will be evident how the mirror is raised when the upper rack 60 moves to the right in Fig. 13.

The mirror and door construction is substantially the same as that of the first described embodiment and, therefore, will not be further described.

In both embodiments the frame is mounted to the front side of the broiler drawer and a hole is provided through which the operating shaft passes. A knob on the shaft on the outside of the drawer permits turning of the shaft and presently the device door, or doors, as the case might be, are opened. Continued turning of the knob effects the raising of the mirror and permits advantageous viewing of the gas jets to determine their burning condition. The mirror is lowered and the door, or doors, are closed resiliently when the knob is released.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described including a frame having a door hinged thereto, the combination of a manually rotatable operating shaft, a pinion carried on said shaft, a rack cooperating with said pinion, a linkage interconnecting said rack and door and adapted when said pinion is rotated to open said door, a stud arranged to move with said rack, a rotatable sleeve having a helical cam slot adapted to receive said stud, said sleeve being rotated by the cooperation of said stud and slot when said rack is moved, a normally vertically disposed mirror, and lever arms connecting said sleeve and mirror whereby said mirror is raised out of its normal disposition when said sleeve is rotated, and a spring interconnecting said rack and frame whereby said rack is returned upon release of said shaft to thereby effect lowering of said mirror and closing of said door.

2. In a device of the class described adapted to be mounted in a broiler drawer, the combination of a frame adapted to be mounted in the drawer and having a heat insulated door hinged thereto, the combination of a manually rotatable operating shaft passing through said drawer and into said frame, a pinion carried on said shaft, a rack cooperating with said pinion, a linkage between said door and rack and adapted when said shaft is rotated to open said door, a stud arranged to move with said rack and to cooperate with a helical cam slot formed in a rotatable sleeve, said sleeve being rotated by said stud when the rack is moved, a mirror adapted normally to be disposed vertically and to be seated in the said door, and lever arms connecting said sleeve and mirror and whereby said mirror is raised out of its normal disposition after the door is opened and the sleeve is rotated.

3. In a device of the class described adapted to be mounted in a broiler drawer, the combination of a frame adapted to be mounted in the drawer and having a heat insulated door hinged thereto, the combination of a manually rotatable operating shaft passing through said drawer and into said frame, a pinion carried on said shaft, a rack cooperating with said pinion, a linkage between said door and rack and adapted when said shaft is rotated to open said door, a stud arranged to move with said rack and to cooperate with a helical cam slot formed in a rotatable sleeve, said sleeve being rotated by said stud when the rack is moved, a mirror adapted normally to be disposed vertically and to be seated in the said door, and lever arms connecting said sleeve and mirror and whereby said mirror is raised out of its normal disposition after the door is opened and the sleeve is rotated, and a spring connecting said rack with said frame and whereby said rack is returned upon release of said shaft to thereby first return said mirror to its vertical disposition and thereafter close said door.

4. In a device of the class described adapted to be mounted in a broiler drawer, the combination of a frame adapted to be mounted to the drawer and having a heat insulated door hinged thereto, the combination of a manually rotatable operating shaft passing through said drawer and into said frame, a pinion carried on said shaft in said frame, a rack cooperating with said pinion, a linkage between said door and rack and adapted when said shaft is rotated to open said door, a stud arranged to move with said rack and to cooperate with a helical cam slot formed in a rotatable sleeve, said sleeve being rotated by said stud when the rack is moved, a mirror frame, a mirror mounted insulatedly in said frame and adapted normally to be disposed vertically and in the said door, and lever arms connecting said sleeve and mirror frame and whereby said mirror is raised from its normal disposition after the door is opened and the sleeve is rotated.

5. In a device of the class described adapted to be mounted in a broiler drawer, the combination of a frame adapted to be mounted to the drawer and having a heat insulated door hinged thereto, the combination of a manually rotatable operating shaft passing through said drawer and into said frame, a pinion carried on said shaft in said frame, a rack cooperating with said pinion, a linkage between said door and rack and adapted when said shaft is rotated to open said door, a stud arranged to move with said rack and to cooperate with a helical cam slot formed in a rotatable sleeve, said sleeve being rotated by said stud when the rack is moved, a mirror frame, a mirror mounted insulatedly in said frame and adapted normally to be disposed vertically and in the said door, and lever arms connecting said sleeve and mirror frame and whereby said mirror is raised from its normal disposition after the door is opened and the sleeve is rotated, and a spring connecting said rack is returned upon release of said shaft to thereby first return said mirror to its vertical disposition and thereafter close said door.

6. In a device of the class described the combination of a frame, a pair of doors each mounted fixedly on a hinge pin pivotally supported at a side edge of said frame, a manually operable pinion disposed in a housing, upper and lower racks both cooperating with said pinion, a link pivotally connected to each of said racks and having a stud disposed in and adapted to follow a slot in the housing, and bell cranks secured on said hinge pins and arranged to be rotated by said studs to open said doors when said racks are moved by said pinion, and springs connecting said racks with said frame to return same and thereby close said doors.

7. In a device of the class described the combination of a frame, a pair of doors each mounted fixedly on a hinge pin pivotally supported at a side edge of said frame, a manually operable pinion disposed in a housing, upper and lower racks both cooperating with said pinion, a link pivotally connected to each of said racks and having a stud disposed in and adapted to follow a slot in the housing, and bell cranks secured on said hinge pins and arranged to be rotated by said studs to open said doors when said racks are moved by said pinion, a mirror, a stud arranged to move with one of said racks and to cooperate with a helical cam slot in a rotatable sleeve, said sleeve being rotated by said stud when the rack is moved and after the doors have opened, and lever arms connecting said sleeve and mirror and whereby said mirror is raised when the sleeve is rotated.

8. In a device of the class described the combination of a frame, a pair of doors each mounted fixedly on a hinge pin pivotally supported at a side edge of said frame, a manually operable pinion disposed in a housing, upper and lower racks both cooperating with said pinion, a link pivotally connected to each of said racks and having a stud disposed in and adapted to follow a slot in the housing, and bell cranks secured on said hinge pins and arranged to be rotated by said studs to open said doors when said racks are moved by said pinion, a mirror, a stud arranged to move with one of said racks and to cooperate with a helical cam slot in a rotatable sleeve, said sleeve being rotated by said stud when the rack is moved and after the doors have opened, and lever arms connecting said sleeve and mirror and whereby said mirror is raised when the sleeve is rotated, and springs interconnecting said racks and frame and whereby said racks are returned to thereby first lower the said mirror and thereafter close the doors.

9. In a device of the class described, a frame, a pair of doors each mounted fixedly on a hinge pin pivotally supported at a side edge of said frame, a manually operable pinion disposed in a housing, upper and lower racks both engaging said pinion, a link pivotally connected to each of said racks and having a stud disposed in and adapted to follow a slot in the housing, bell cranks secured on said hinge pins and arranged to be rotated by said studs to open said doors when said racks are moved by said pinion, a rotatively mounted horizontal sleeve, a stud mounted on one of said racks, said sleeve having a helical cam slot engaged by said latter stud causing said sleeve to be rotated when said racks are moved, and a mirror mounted on said sleeve to be raised as said sleeve rotates.

AARON PALATNICK.

REFERENCES CITED

The following references are of record in the file of this patent:

UNITED STATES PATENTS

| Number | Name | Date |
| --- | --- | --- |
| 588,845 | Walker | Aug. 24, 1897 |
| 746,203 | Trowbridge | Dec. 8, 1903 |
| 821,846 | Allen et al. | May 29, 1906 |
| 925,182 | Harvey | June 15, 1909 |
| 1,349,558 | Calvert | Aug. 17, 1920 |
| 1,746,225 | Rauh | Feb. 4, 1930 |
| 1,900,176 | Flewell | Mar. 7, 1933 |
| 1,959,897 | Bergman | May 22, 1934 |
| 1,999,476 | Pollack | Apr. 30, 1935 |
| 2,188,739 | Muller | Jan. 30, 1940 |
| 2,281,608 | Vincent | May 5, 1942 |